United States Patent

Drynkin et al.

(10) Patent No.: US 6,636,462 B1
(45) Date of Patent: Oct. 21, 2003

(54) PROGRAMMABLE COMPACT DISK DUPLICATION SYSTEM WITH XYZ TRANSPORT MECHANISM

(76) Inventors: Alexander V. Drynkin, 1195 Lincoln Ave., Walnut Creek, CA (US) 94596; David B. Miller, 20 La Espiral, Orinda, CA (US) 94563; William M. Hess, 130 Marston Ave., San Francisco, CA (US) 94112

( * ) Notice: Subject to any disclaimer, the term of this patent is extended or adjusted under 35 U.S.C. 154(b) by 0 days.

(21) Appl. No.: 09/855,944

(22) Filed: May 14, 2001

(51) Int. Cl.[7] ................................................ G11B 17/22
(52) U.S. Cl. ................................... 369/30.19; 369/30.05
(58) Field of Search ......................... 369/30.19, 30.28, 369/30.31, 30.32, 30.18, 30.03, 30.05, 30.33, 30.34, 53.24, 53.37, 84

(56) References Cited

U.S. PATENT DOCUMENTS

| | | | |
|---|---|---|---|
| 4,327,834 A | * | 5/1982 | Kalthoff et al. |
| 4,685,001 A | | 8/1987 | Martin |
| 4,989,191 A | | 1/1991 | Kuo |
| 5,025,431 A | | 6/1991 | Naito |
| 5,033,038 A | | 7/1991 | Kobayashi et al. |
| 5,036,503 A | | 7/1991 | Tomita |
| 5,040,159 A | | 8/1991 | Oliver et al. |
| 5,056,073 A | | 10/1991 | Fitzgerald et al. |
| 5,418,763 A | | 5/1995 | Ichikawa et al. |
| 5,423,619 A | | 6/1995 | Kohno |
| 5,481,514 A | | 1/1996 | Yamasaki et al. |
| 5,495,457 A | | 2/1996 | Takagi |
| 5,610,893 A | * | 3/1997 | Soga et al. |
| 5,640,535 A | | 6/1997 | Suzuki et al. |
| 5,703,453 A | | 12/1997 | An |
| 5,724,321 A | | 3/1998 | Vishlitzky |
| 5,802,020 A | | 9/1998 | Kaneko et al. |
| 5,805,538 A | * | 9/1998 | Kamada et al. |
| 5,854,776 A | | 12/1998 | Sakiyama |
| 5,914,918 A | | 6/1999 | Lee et al. |
| 5,946,216 A | | 8/1999 | Hollerich |
| 5,982,719 A | * | 11/1999 | Nishijima et al. |
| 6,141,298 A | | 10/2000 | Miller |
| 6,208,612 B1 | * | 3/2001 | Miller |
| 6,222,800 B1 | * | 4/2001 | Miller et al. |
| 6,327,230 B1 | | 12/2001 | Miller et al. |
| 6,452,893 B1 | * | 9/2002 | Wahl |

FOREIGN PATENT DOCUMENTS

| | | |
|---|---|---|
| JP | 60-66382 | 4/1985 |
| JP | 3-269865 | 12/1991 |
| JP | 4-268276 | 9/1992 |
| JP | 11-232835 | 2/1998 |
| JP | 10-307963 | 11/1998 |

* cited by examiner

*Primary Examiner*—Ali Neyzari
(74) *Attorney, Agent, or Firm*—Richard Esty Peterson

(57) ABSTRACT

A compact disk duplication system with a compact disk drive with an extendible disk tray for copying data onto a batch of compact disks, the disk duplication system having a disk transport unit with an XYZ transport mechanism, the transport unit having a deck, a frame and a housing, the transport mechanism including a carriage displaceable from side to side relative to the deck, an elevator device carried by the carriage having an elevator cage displaceable up and down relative to the deck, and a tram device having a cross beam on the elevator cage with a tram having a disk pickup mechanism displaceable fore and aft relative to the deck with the displacements of the carriage, elevator cage and tram being controlled for automatic operation by controlled drive mechanisms.

17 Claims, 4 Drawing Sheets

PROGRAMMABLE COMPACT DISK DUPLICATION SYSTEM WITH XYZ TRANSPORT MECHANISM

BACKGROUND OF THE INVENTION

This invention relates to a compact disk duplication system and in particular to a new transport mechanism in a disk duplication system for increasing the number of compact disks or CDs that can be copied by a set of disk drives. The transport mechanism is incorporated into a robotic, self-operating compact disk duplication system of the type described in U.S. Pat. No. 6,208,612, issued Mar. 27, 2001.

In the referenced patent, multiple disk storage spindles are vertically arranged in a compact disk duplication system having a transport mechanism with a disk transport arm on a vertically traveling transport belt. The limited vertical travel of the disk transport mechanism requires that the disk storage spindles and access trays of the disk drives be extended into the path of travel of the transport arm to allow a disk capture mechanism on the arm to engage or release a compact disk to or from the spindle or tray. Additionally, when the system includes a printer, a similar procedure is performed to seat or retrieve a compact disk from an extended tray of the printer.

The disk duplication system of the referenced patent permits the system to be incorporated into a compact unit with a small footprint. However, because of the limitations in travel of the transport mechanism, and the use of stacked disk storage spindles, the system is limited in capacity and is not easily expanded without inconvenience to the user in accessing the disk storage spindles.

The unique multiple-dimension, transport mechanism in this invention permits a disk duplication system to be expanded in its disk handling capacity with minimal change in design or operation. The disk transport mechanism permits a disk capture device to be transported in an X, Y and Z direction providing a greatly expanded capability. Multiple disk storage spindles or other disk containment structures for storing stacked compact disks at storage stations can be arranged side by side in a series providing four or more storage stations. The disk storage spindles and other components of the disk duplication system are readily accessible to the user.

These and other features of the disk transport mechanism and disk duplication are described herein.

SUMMARY OF THE INVENTION

The compact disk duplication system of this invention has multiple disk drives for rapid automatic duplication of multiple disks and incorporates a unique disk transport mechanism. The disk duplication system using the multiple-dimension, transport mechanism featured in this invention is designed to optionally include a disk label printer and is also designed to duplicate circular, oval, rectangular or other configurations of compact disks.

The compact disk transport mechanism includes embedded software as described in U.S. Pat. No. 6,208,612, the description of which is incorporated herein by reference. The embedded software is modified in the transport commands to accommodate the horizontal rather than vertical overall arrangement of the disk storage stations. Although the disk transport mechanism of this invention can be used with only two disk storage stations, for example, an input station and an output station, alternate means must be provided for rejected disks, such as a discard chute. Typically, for optimized use of the multiple-dimension, transport mechanism of this invention, three and preferably four disk storage stations are utilized with an input station for a stack of uncopied disks, an output station for a stack of copied disks, a discard station for rejected disks, and a holding station for temporary storage of disks. The holding station provides a temporary location for parked disks which is particularly useful when the timing of a printing operation does not exactly match the timing of a disk copying operation.

When adding additional input and output stations to a disk duplication system, a transport mechanism must be capable of depositing or retrieving a disk from the top of a stack and moving from any one of multiple stacked disk drives to any one of the storage stations. The addition of one or more printers further expands the possible paths of travel. To resolve the complexities in a disk duplication system having a variety of options and configurations, the multiple-dimension, or XYZ, transport mechanism in this invented system was devised. The XYZ transport mechanism moves a mechanical or pneumatic disk pickup device in a fore and aft, side to side, and up and down displacement to pick and place compact disks at the programmed location in the defined sequence of operations.

It is to be understood that the term compact disk includes different types of disks including CDR disks, eraseable CD disks, DVD disks and other recordable disks of different sizes and shapes including rounded-rectangular disks and oblong disks popular as business and information cards, and miniature disks.

DETAILED DESCRIPTION OF THE PREFERRED EMBODIMENTS

Figure 1:
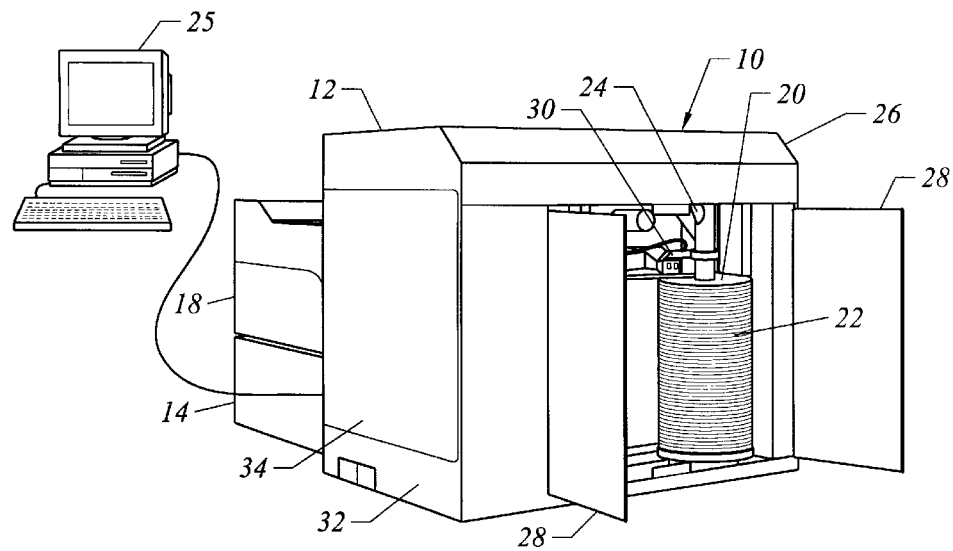
FIG. 1 is a perspective view of one embodiment of the compact disk duplication system with an XYZ disk transport mechanism.

The compact disk duplication system of this invention is shown in a first embodiment in the perspective view of FIG. 1 and designated by the reference numeral 10. The compact disk duplication system 10 of FIG. 1 includes a programmable disk transport unit 12 coupled to a multiple disk drive unit 14, having four compact disk drives 16 in two stacks (not visible in FIG. 1), and a printer unit 18.

The compact disk duplication system of this arrangement allows automatic copying and printing of blank compact disks 20 shown in a stack 22 on a removable spindle 24 in the disk transport unit 12. It is to be understood that a stack of disks can be contained in a containment structure such as a bin or corral, particularly where a mechanical disk capture device is utilized to pick and place disks among the components of the system.

The disk drives 16 of the multiple drive unit are of conventional design with extendable trays to receive a disk for duplication of data from a master disk or stored in the memory of the processor associated with the disk transport unit 12. Similarly, label printing may be accomplished from a thermal printer or ink jet printer from digitized graphics stored in the memory of the associated processor or printer memory or transferred to the processor or printer memory from a compact disk read with one of the drive units. Where the associated processor is connected to the world wide net, both the data to be copied to the disks and the digitized graphics to be applied to the disk can be received by the processor from a remote source. The associated processor is an auxiliary computer 25 connected to the disk transport unit 12 as schematically illustrated in FIG. 1 or incorporated into the disk transport unit, as described with reference to FIGS. 2–6.

The disk transport unit 12 has a user control panel 26 for simplified user operation of the compact disk duplication system 10. In FIG. 1 the transport unit 12 is shown with two access doors 28 opened to allow a user access to a pair of removable spindles 24 which have a capacity of 200 stacked compact disks 20. The disk transport unit 12 has an internal XYZ transport mechanism 30 and an external housing 32, which houses the transport mechanism and internal electronics. A side access panel 34 permits access to most of the internal electronics and certain of the control components that provide for operation of the unit.

It is to be understood that the compact disk duplication system can have other arrangements, for example, the elimination of the printer unit and addition of another multiple drive unit for acceleration of the data copying procedure. Additionally, as shown and described with reference to FIGS. 7–8, the transport unit 12 can be expanded with additional disk storage stations for added drives and printers providing great versatility in customizing a disk duplicating and printing system.

Figure 2:
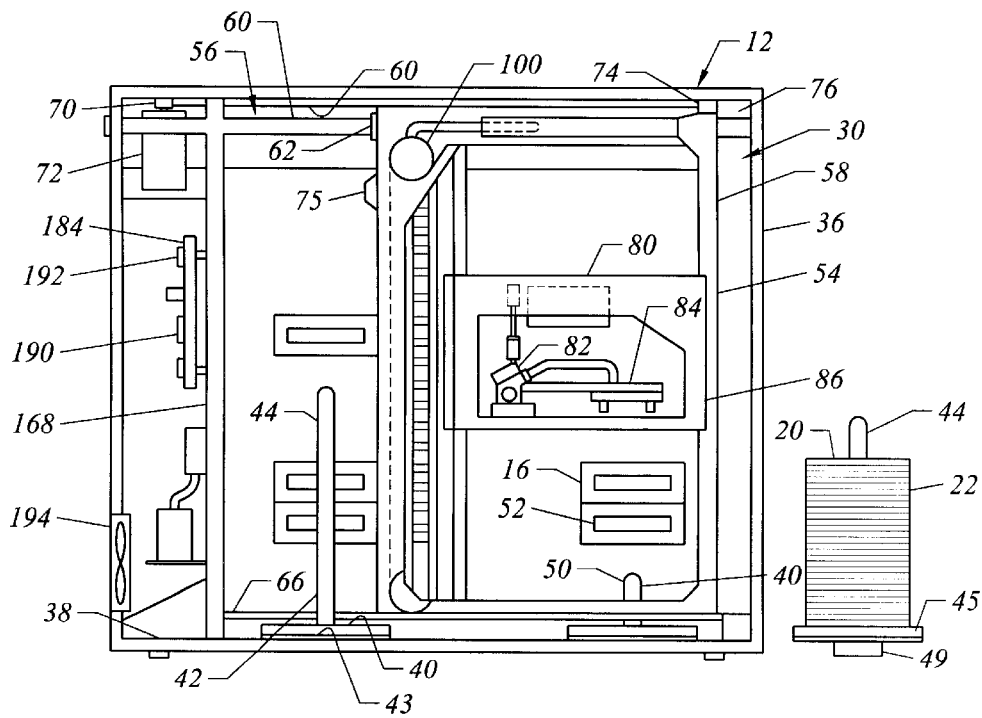
FIG. 2 is a front elevational view of the disk duplication system showing the transport unit with housing removed to show the XYZ disk transport mechanism.

Referring now to FIG. 2, the disk transport unit 12 is shown with the housing removed and the XYZ transport mechanism 30 incorporated into a support frame 36. The support frame 36 has a deck 38 with multiple disk storage stations 40.

In the embodiment of FIG. 1 there are four disk storage stations 40 with two front stations that are dedicated to disk stack structures 42 that can carry a full batch of disks to be copied. The stack structures 42 are removable spindles 44 with a capacity of 200 stacked disks. One removable spindle 44 is shown mounted in a recess 43 in a deck plate 48. The deck plate 48 is removable to allow for replacement of the spindle system with an alternate containment structure such as the bin in FIG. 9. The other removable spindle 44 is shown beside the support frame 36 with a stack 22 of compact disks 20. The spindles 44 have a base 45 with a plug 49 that fits the recess 43 in the deck plate 48.

In the back of the deck 38 the two storage stations 40 have low capacity stack structures 42 in the form of spindles 50 (one visible in FIG. 2). The spindles 50 at the back of the deck 38 are short in height to provide clearance for the extended trays 52 of stacked disk drives 16. The back spindles 50 are fixed to the removable deck plate 48 and are replaceable with other disk containment structures as noted.

Figure 3:
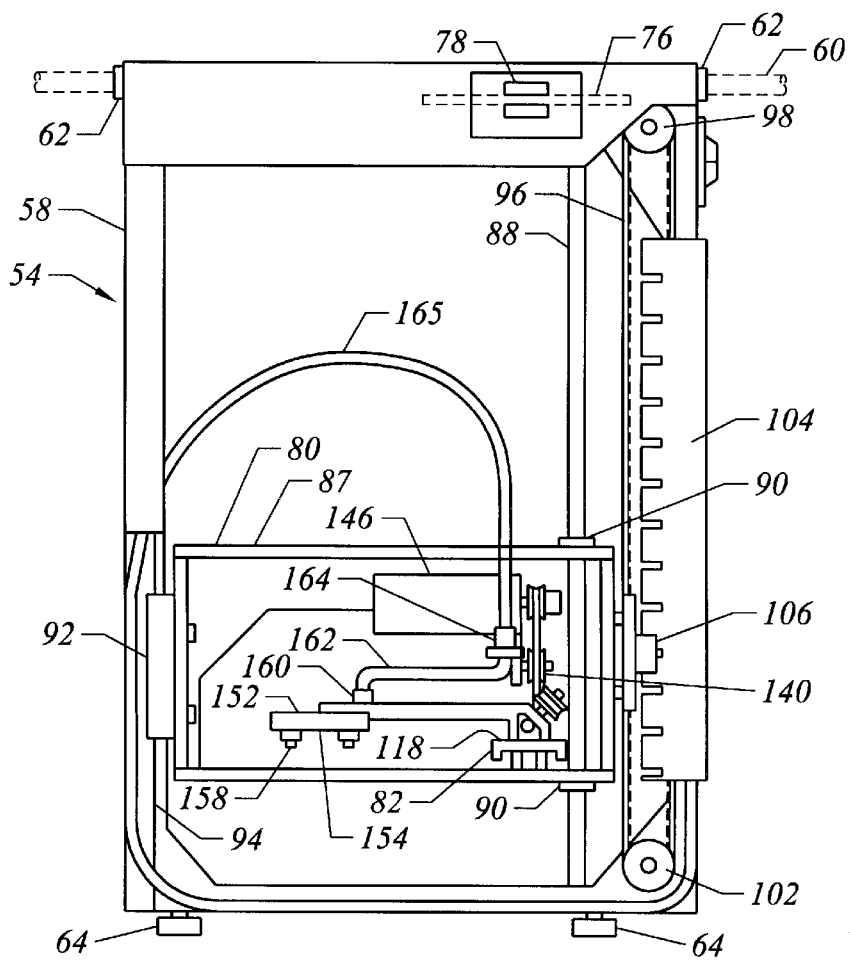
FIG. 3 is an elevational view of the backside of a carriage in the XYZ disk transport mechanism of FIG. 2.

The XYZ transport mechanism 30 has a carriage 54 that is displaceable side to side on a carriage way 56. The carriage 54 is constructed with a rectangular frame 58 that is suspended on a horizontal guide rod 60 through low friction support bushings 62 in the frame 58. As shown in the enlarged view of the carriage 54 in FIG. 3, the carriage has guide wheels 64 or bearings that engage a guide rail 66 in the form of a U-channel on the deck 38 to maintain alignment. The guide rail 66 is located on the deck 38 between the front and back disk storage stations 40. The carriage 54 is displaced by a drive belt 68 partially visible in FIG. 1 which loops around a drive wheel 70 of a drive motor 72 at one side of the support frame 36 and a pulley wheel 74 near the other side of the frame 36. The belt 68 is fixed to the frame 58 of the carriage 54 so that the carriage 54 is displaced on operation of the drive motor 72. A stop 75 on the frame 58 of the carriage 54 prevents inadvertent contact of the components carried by the carriage frame 58 with the support frame 36. The drive motor 72 is a reversible DC motor that moves the belt 68 and connected carriage 54 in either direction. A notched clocking track 76 parallel to the guide rod 60 provides feedback for carriage location when sensed by an optical sensor 78 on the carriage 54 as shown in FIG. 3. It is to be understood that a more expensive stepping motor can be substituted for the combination reversible DC motor and clocking tracks used in this transport mechanism 30.

The carriage 54 carries an elevator device 80 which in turn transports a tram device 82 for fore and aft displacements of a disk pickup mechanism 84. The elevator device 80 includes an elevator cage 86 in the form of a rectangular frame 87. The elevator cage 86 is carried on a vertical guide rod 88 that engages low friction slide bushings 90 on one side of the cage 86 and is aligned by a slotted nylon guide 92 that engages a guide rail 94 at the opposite side of the cage 86.

Figure 4:
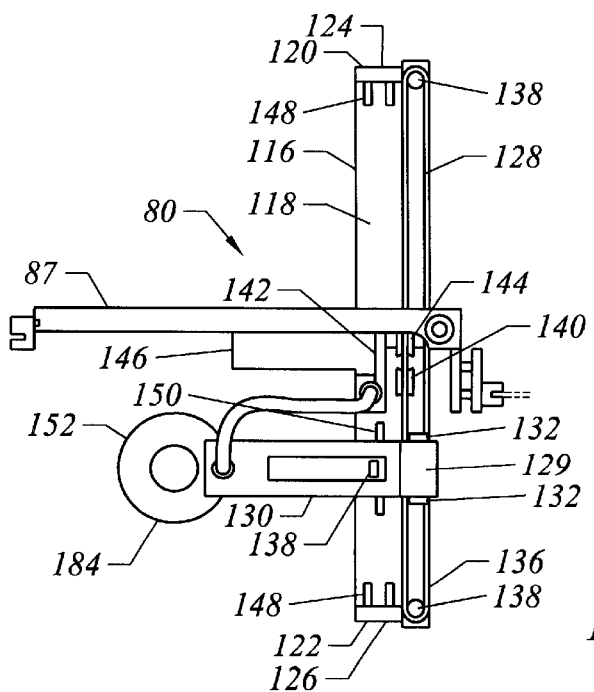
FIG. 4 is a top view of an elevator device and tram device carried by the carriage in the XYZ disk transport mechanism of FIG. 2.
Figure 5:
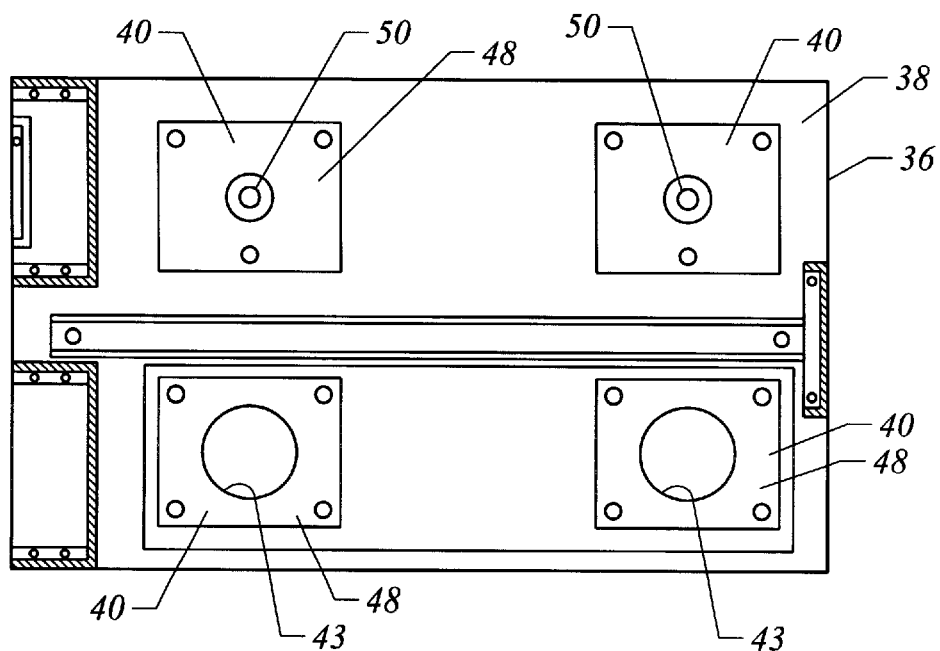
FIG. 5 is a top view of the deck of the transport unit.

The elevator device 80, also shown in FIG. 4, includes a drive belt 96 that is fixed to the cage 86. The drive belt 96 loops around a drive wheel 98 on a drive motor 100 mounted on the top part of the frame 58 of the carriage 54 and around a pulley wheel 102 mounted on the bottom part of the frame 58. The drive motor 100 is a reversible DC motor to raise and lower the elevator cage 86 and, in this embodiment, works in combination with a vertical notched clocking track 104 fixed to the frame 58 of the carriage 54 and an optical sensor 106 mounted on the frame 87 of the elevator cage 86.

The elevator cage 86 carries the tram device 82 which includes a tram way 116 with a cross beam 118 perpendicular to the plane of the frame 87 of the elevator cage 86. The cross beam 118 has opposite ends 120 and 122 cantilevered over the deck 38 on opposite sides of the frame 87. The ends have turned up brackets 124 and 126 which support the ends of a guide rod 128 that guides a tram 129 in the form of an arm 130 having low friction guide bushings 132 at the connected end of the tram arm 130. The tram arm 130 is pivotal about the axis of the guide rod 128 and has a roller 134 that bears on the top of the cross beam 118 to horizontally position the tram arm 130. The tram arm 130 supports the disk pickup mechanism 84 at is distal end and the pivotal connection of the tram arm 130 allows limited pivotal movement of the tram arm to assist in preventing damage to the pickup mechanism 84 in the event of inadvertent contact with an object or component.

To displace the tram arm 130 fore and aft over the deck 38, the tram arm 130 is connected to an endless cable 136. The endless cable 136 wraps around two canted pulley wheels 138 mounted on the end brackets 124 and 126, around two idler wheels 140 mounted on a motor bracket 142 on the frame 87 of the elevator cage 86, and a drive wheel 144 of a drive motor 146.

Since the extended tray positions of the disk drives and printers are aligned with the aft location of the disk storage stations only two positions of the tram arm 130 on the cross beam 118 need be defined. The end brackets 124 and 126 of the cross beam 118 each have a sensor 148 that cooperates with a projecting tab 150 on each side of the tram arm 130 to detect the displacement limits of the tram arm 130. It is to be understood that this arrangement can be replaced with a clocking track and sensor arrangement where necessary to accommodate a system configuration requiring variable fore and aft positioning of the pickup mechanism 84.

In the embodiment shown, the pickup mechanism 84 is pneumatic with a pickup head 152 having a hollow annular ring 154 with three depending pickup fittings 156 having soft accordion-like pickup nipples 158 that contact the central top surface of a disk. Swiveling suction hose terminals 160 on top of the ring 154 and motor bracket 142 connect a flexible suction hose 162 between the tram arm 130 and elevator cage. The suction hose terminal 164 on the elevator cage connects to a flexible hose 165 carried on the carriage 54 that connects to a suction supply terminal 166 on the side of a recessible end wall 168 of the support frame 36.

Figure 6:
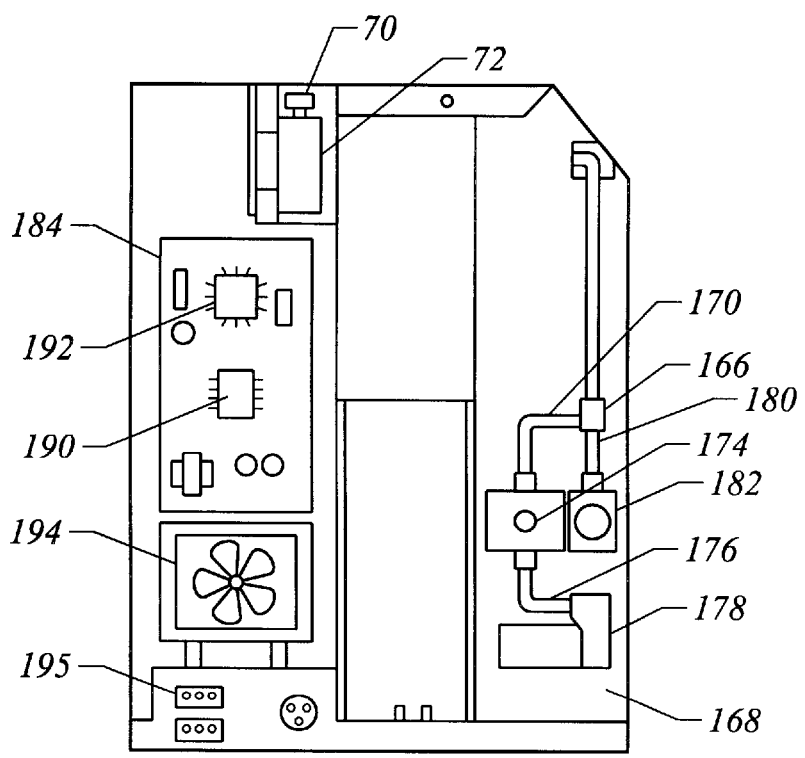
FIG. 6 is a side elevational view of the disk transport mechanism of FIG. 2.

Referring to the end view of the XYZ transport mechanism in FIG. 6, the suction supply terminal 166 is a tee with a suction hose 170 connected to a switching valve 172 with a relief port 174 and suction hose 176 connected to an electric suction pump 178. A bypass hose 180 connects to an electric pressure relief valve 182 that allows for electronic control of the suction pressure.

The recessed end wall 168 also provides a support for one or more electronic boards 184 that includes the controller 190 for systems operation and, in this embodiment, the computer processor 192 for data and graphics management.

A filtered fan unit 194 draws sufficient filtered air into the housing 32 of the transport unit to create a slight positive pressure to minimize the entry of dust and other contaminants into the system. Additionally, the support frame 36 has a bracket for mounting a series of connection terminals 195 connecting the internal electronic systems with the auxiliary components including disk drives, printers and an external computer.

Figure 7:
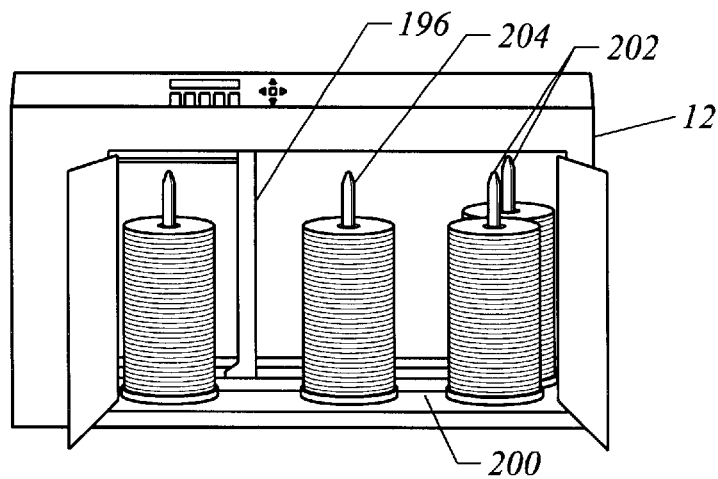
FIG. 7 is a schematic perspective view of an expanded transport unit.
Figure 8:
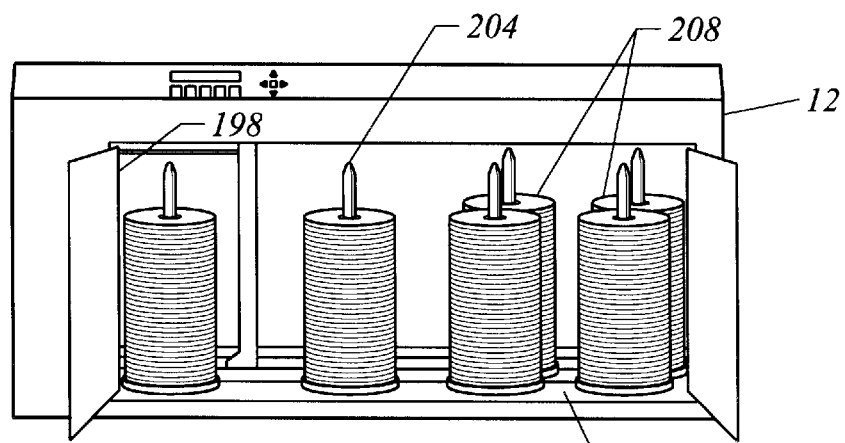
FIG. 8 is a schematic perspective view of an additional expanded transport unit.

Referring now to FIGS. 7 and 8, the basic configuration of the disk transport unit 12 can be expanded to accommodate 600 disks in the XYZ transport mechanism 196 of FIG. 7 and 1000 disks in the XYZ transport mechanism 198 of FIG. 8.

In FIG. 7 the deck 200 includes two additional disk storage stations 202 at the front and back of the transport mechanism 198. The back station 202 can include a large capacity spindle 204 or, when an additional drive unit is included, a small capacity spindle (not shown) allowing clearance for an extended drive tray.

Similarly, in FIG. 8, the deck 206 includes four additional disk storage stations 208 again with the option of replacing the large capacity spindles 204 at the back with small capacity spindles when two additional drive units are included. The drive units have one to four stacked disk drives providing a maximum of twelve disk drives for the optional arrangement of FIG. 8.

Figure 9:
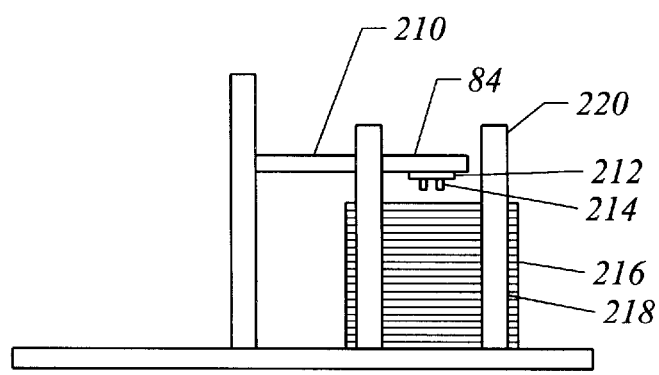
FIG. 9 is a schematic elevational view of an alternate pickup mechanism for the transport unit of FIG. 1.

Referring now to the schematic view of FIG. 9, the disk pickup mechanism 84 is mechanical with a pickup arm 210 having a pickup head 212 at the distal end of the arm with prongs 214 that engage the center hole of the disks, here shown as a stack of oval-shaped disks 216 in an open-sided bin 218 formed by contoured corner guides 220. This arrangement is effective in maintaining the alignment of the stack of oblong disks.

The mechanical pickup head 212 is of the type described in our U.S. Pat. No. 6,222,800, issued on Apr. 24, 2001, incorporated herein by reference. The pickup prongs 214 are splayed after insertion into the disk hole to engage the top disk for pickup and transport. The prongs are contracted to release the disk when the pickup head is over an extended tray of a printer or drive, or over a storage station. These and other modifications can be made to the disk transport unit for a particular system.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A compact disk duplication system comprising one or more compact disk drives having an extendible tray for copying data onto compact disks, and a disk transport unit having an XYZ transport mechanism the transport unit having a housing, a user control panel and an access to the transport mechanism for loading and unloading stacks of compact disks, the XYZ transport mechanism including:

a deck having a plurality of disk storage stations;

a support frame on the deck;

a carriage way mounted to the support frame and deck;

a carriage engageable with the carriage way, the carriage being displaceable side to side on the carriage way relative to the deck;

an elevator device mounted on the carriage and displaceable with the carriage, the elevator device having a vertical guide structure mounted to the carriage and an elevator cage, the elevator cage being displaceable up and down on the vertical guide relative to the deck;

a tram device mounted on the elevator cage and displaceable with the elevator cage, the elevator device having a tram way mounted to the elevator cage and a tram having a disk pickup mechanism, the tram being displaceable fore and aft relative to the deck; and, controlled drive mechanisms operably connected to the carriage, the elevator device and the tram device wherein, on operation of the controlled drive mechanisms, the disk pickup mechanism is selectively positioned over one of the disk storage stations and disk drive tray when extended.

2. The compact disk duplication system of claim 1 wherein the access to the transport mechanism comprises access doors which when open provide access to the transport mechanism and disk storage stations.

3. The compact disk duplication system of claim 1 wherein the disk storage stations include a disk stack containment structure constructed to contain a stack of disks.

4. The compact disk duplication system of claim 3 wherein the disk stack containment structure includes a spindle, wherein disks having a center hole are contained in a stack by locating the disks on the spindle through the center hole of the disks.

5. The compact disk duplication system of claim 3 wherein the disk stack containment structure comprises a bin with an access for the disk pickup mechanism.

6. The compact disk duplication system of claim 1 comprising further, a disk printer having an extendible disk printer tray wherein on operation of the controlled drive mechanisms the disk pickup mechanism is selectively positioned over one of the disk storage stations, the disk drive tray when extended, and the disk printer tray when extended.

7. The compact disk duplication system of claim 1 wherein the carriage way includes a rail on the deck and a horizontal guide rod having ends mounted to the support frame wherein the carriage is slideably connected to the guide rod with guide bearings engaging the rail.

8. The compact disk duplication system of claim 1 wherein the vertical guide structure of the elevator device mounted to the carriage includes a vertical guide rod having ends mounted to the carriage and vertical guide rail wherein the elevator cage is slideably connected to the guide rod with a slotted guide that engages the guide rail.

9. The compact disk duplication system of claim 1 wherein the tram way includes a cross beam mounted on the elevator cage, the cross beam having a guide rod, wherein the tram is slideably connected to the guide rod.

10. The compact disk duplication system of claim 9 wherein the tram includes a tram arm pivotally connected to the guide rod of the tram device and a roller connected to the arm, the roller bearing on the cross beam for horizontal positioning of the tram arm.

11. The compact disk duplication system of claim 1 wherein the XYZ transport mechanism includes a vacuum pump and wherein the disk pickup mechanism has a pneumatic pickup head with disk contact nipples, the disk contact nipples being pneumatically connected to the vacuum pump for selectively providing a vacuum at the contact nipples.

12. The compact disk duplication system of claim 1 wherein the disk pickup mechanism is a mechanical device with disk engageable elements that are selectively operated to engage and release disks from the tram.

13. The compact disk duplication system of claim 1 wherein the controlled drive mechanisms each comprise one of a motor driven belt mechanism and motor driven cable system.

14. The compact disk duplication system of claim 13 wherein the motor driven belt system has a drive motor and drive belt, wherein controlled operation of the drive motor transports the drive belt.

15. The compact disk duplication system of claim 13 wherein the motor driven cable system has a drive motor and drive cable, wherein controlled operation of the drive motor transports the drive cable.

16. The compact disk duplication system of claim 1 wherein the number of disk storage stations are expandible.

17. A compact disk duplication system comprising one or more compact disk printers having an extendible tray for copying data onto compact disks, and a disk transport unit having an XYZ transport mechanism the transport unit having a housing, a user control panel and an access to the transport mechanism for loading and unloading stacks of compact disks, the XYZ transport mechanism including:
a deck having a plurality of disk storage stations;
a support frame on the deck;
a carriage way mounted to the support frame and deck;
a carriage engageable with the carriage way, the carriage being displaceable side to side on the carriage way relative to the deck;
an elevator device mounted on the carriage and displaceable with the carriage, the elevator device having a vertical guide structure mounted to the carriage and an elevator cage, the elevator cage being displaceable up and down on the vertical guide relative to the deck;
a tram device mounted on the elevator cage and displaceable with the elevator cage, the elevator device having a tram way mounted to the elevator cage and a tram having a disk pickup mechanism, the tram being displaceable fore and aft relative to the deck; and,
controlled drive mechanisms operably connected to the carriage, the elevator device and the tram device wherein, on operation of the controlled drive mechanisms, the disk pickup mechanism is selectively positioned over one of the disk storage stations and disk printer tray when extended.

* * * * *